(12) United States Patent
Narakino et al.

(10) Patent No.: US 6,795,312 B2
(45) Date of Patent: Sep. 21, 2004

(54) COOLING APPARATUS FOR ELECTRONIC EQUIPMENT

(75) Inventors: Shigeru Narakino, Fukuoka (JP); Kyo Niwatsukino, Fukuoka (JP); Kazuyuki Kasahara, Yokosuka (JP); Masashi Hirose, Kasuga (JP); Yoshimitsu Aizono, Ogori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 14 days.

(21) Appl. No.: 10/264,266

(22) Filed: Oct. 4, 2002

(65) Prior Publication Data

US 2003/0214783 A1 Nov. 20, 2003

(30) Foreign Application Priority Data

May 15, 2002 (JP) ........................................ 2002-139600

(51) Int. Cl.[7] ................................................ G06F 1/20
(52) U.S. Cl. .................... 361/687; 312/223.6; 165/151; 62/507
(58) Field of Search ................................ 361/679–687; 250/370.15; 165/140, 151, 153, 148, 132, 144; 62/507, 509; 312/223.1–223.6

(56) References Cited

U.S. PATENT DOCUMENTS

| 5,048,599 | A | | 9/1991 | Tustaniwskyj et al. | 165/104.33 |
|---|---|---|---|---|---|
| 5,552,608 | A | * | 9/1996 | Gallagher et al. | 250/370.15 |
| 5,757,615 | A | | 5/1998 | Donahoe et al. | 361/687 |
| 6,182,744 | B1 | * | 2/2001 | Nakamura et al. | 165/140 |
| 6,341,062 | B1 | * | 1/2002 | Patel | 361/687 |

FOREIGN PATENT DOCUMENTS

| JP | 4-72795 | 3/1992 |
|---|---|---|
| JP | 05264139 | 3/1992 |
| JP | 5-264139 | 10/1993 |
| JP | 08032263 | 7/1994 |
| JP | 7-142886 | 6/1995 |
| JP | 07142886 | 6/1995 |
| JP | 8-32263 | 2/1996 |
| JP | 8-288681 | 11/1996 |
| JP | 10-185465 | 7/1998 |
| JP | 10-213370 | 8/1998 |
| JP | 2000-222072 | 8/2000 |
| JP | 2001-24372 | 1/2001 |

* cited by examiner

*Primary Examiner*—Hung Van Duong
(74) *Attorney, Agent, or Firm*—McDermott Will & Emery LLP

(57) ABSTRACT

A circulation path, a radiator and a reserve tank which can remove air bubbles from the fluid passageway, constitute parts of a closed circulation path, and are formed by joining a flow path wall-forming radiation board on which curved surfaces as flow path walls are formed, with a flat plate-like flow path wall-forming radiation board as another curved surface by welding or the like. Therefore, the efficiency of heat exchange of a cooling apparatus for electronic equipment can be improved, removal of air bubbles from the flow passageway and reduction in size, weight and thickness is made possible without causing air lock.

101 Claims, 10 Drawing Sheets

(a)

(b)

COOLING APPARATUS FOR ELECTRONIC EQUIPMENT

BACKGROUND OF THE INVENTION

1. Field of the Invention

This invention relates generally to a cooling apparatus, with one exemplary embodiment being a cooling apparatus for cooling a heating electronic component of a central processing unit (hereinafter referred to as CPU) or the like arranged inside a casing, by circulating a refrigerant therethrough.

2. Description of the Related Art

The recent very rapid increase in the processing speed of computers has increased the clock frequency of a CPU, compared with computers in the past. As a result, the calorific value of the CPU increases and the cooling capability of air cooling by a heat sink as in a conventional technique is insufficient. Therefore, a highly efficient high-output cooling apparatus is required. Thus, as such a cooling apparatus, a cooling apparatus for cooling a board with a heating component mounted thereon by circulating a refrigerant therethrough is known, as disclosed in the Japanese Publication of Unexamined Patent Application No. H5-264139 and the Japanese Publication of Unexamined Patent Application No. H8-32263.

Such a conventional cooling apparatus for electronic equipment for cooling by circulating a refrigerant will now be described. The term "electronic equipment" in this specification includes, but is not limited to, a device which loads a program to its CPU or the like and performs arithmetic processing, for example, a portable small device such as a notebook model personal computer, and/or a device having a heating element which heats when it is electrified. A conventional first cooling apparatus is shown in FIG. 8. FIG. 8 is a structural view of the first cooling apparatus for electronic equipment. In FIG. 8, 100 represents a casing, 101 represents a heating component, 102 represents a board with the heating component 101 mounted thereon, 103 represents a cooler for performing heat exchange between the heating component 101 and a refrigerant and thus cooling the heating component 101, 104 represents a radiator for removing the heat from the refrigerant, 105 represents a pump for circulating the refrigerant, 106 represents piping for connecting these elements, and 107 represents a fan for air-cooling the radiator 104.

The operation of this conventional first cooling apparatus will now be described. The refrigerant ejected from the pump 105 passes through the piping 106 and is fed to the cooler 103. There, as the refrigerant takes up the heat of the heating component 101, its temperature rises and the refrigerant is fed to the radiator 104. As the refrigerant is cooled by forced air cooling by the fan 107, its temperature is lowered and the refrigerant is fed back to the pump 105. This procedure is repeated. In this manner, the conventional cooling apparatus is adapted for cooling by circulating the refrigerant and thus removing the heat from the heating component 101.

A second conventional cooling apparatus for electronic equipment is disclosed in the Japanese Publication of Unexamined Patent Application No.H7-142886. This apparatus is schematically shown in FIG. 9. This second cooling apparatus is adapted for efficiently carrying generated heat of a heating member to a metallic casing wall as a radiator part and thus cooling the heating member when the heating member is mounted within a narrow casing. In FIG. 9, 108 represents a wiring board of an electronic equipment, 109 represents a keyboard, 110 represents a semiconductor heating element, 111 represents a disk device, 112 represents a display device, 113 represents a heat-receiving header for performing heat exchange with the semiconductor heating element 110, 114 represents radiation header for radiation, 115 represents a flexible tube, and 116 represents a metallic casing of the electronic equipment.

In this second cooling apparatus, the semiconductor heating element 110 as a heating member and the metallic casing 116 are thermally connected with each other by a heat carrying device of a flexible structure. This heat carrying device is constituted by the flat heat-receiving header 113 mounted on the semiconductor heating element 110 and having a liquid flow path, the radiation header 114 having a liquid flow path and being in contact with the wall of the metallic casing 116, and the flexible tube 115 connecting these headers. The heat carrying device is adapted for driving or circulating a liquid which is sealed therein, between the heat-receiving header 113 and the radiation header 114 by a liquid driving mechanism provided inside the radiation header 114. Thus, the semiconductor heating element 110 and the metallic casing 116 can be easily connected with each other without being influenced by the component arrangement and the heat is carried out highly efficiently by driving the liquid. In the radiation header 114, since the radiation header 114 and the metallic casing 116 are thermally connected with each other, the heat is broadly diffused to the metallic casing 116 because of a high thermal conductivity of the metallic casing 116.

However, in the conventional first cooling apparatus, the cooler 103 for performing heat exchange between the heating component 101 and the refrigerant and thus cooling the heating component 101, the radiator 104 for removing the heat from the refrigerant, and the pump 105 for circulating the refrigerant are required. To combine these elements, the apparatus is large-sized and complicated and miniaturization thereof is difficult. That is, the conventional first cooling apparatus is originally suitable for cooling a large electronic equipment, but it cannot cope with a recent portable notebook model personal computer of high performance which is small, light and thin and is to be carried in various postures.

As the electronic equipment become smaller and thinner, a cooling apparatus needs to become smaller in size. Therefore, gasification of the refrigerant and mingling of resulting bubbles, which, although can still be problematic in large-sized equipment, may potentially be ignored in the case of a relatively large-sized equipment, can become more problematic in smaller devices such as a portable lab-top computer. In particular, air bubbles formed in the flow passage of a radiator can accumulate in the pump, resulting in air-lock and deterioration in the pump operation. That is, as gasification of the refrigerant and mingling of bubbles occur, the bubbles begin to accumulate in the piping 106 and the pump 105. If the apparatus is used in this state for a long time, the pump 105 will be inoperable because of air lock due to the growing bubbles and the efficiency of heat exchange will be gradually lowered. It is difficult for the user side to exhaust the air which has already been accumulated. Moreover, such troubles in the cooling apparatus determine the life of the electronic equipment.

Meanwhile, the conventional second cooling apparatus can be used in a notebook model personal computer or the like, but both the separate structures of a flat heat-receiving header 113 mounted on the semiconductor heating element 110 and the radiation header 114 in contact with the wall of the metallic casing 116 have to be box-shaped and thick, preventing reduction in thickness of the notebook model personal computer. Moreover, similarly to the first conventional cooling apparatus, the conventional second cooling apparatus does not have any mechanism by which to remove and restrict air bubbles from the fluid passageway of the radiator. Accordingly, in the conventional cooling apparatus said air bubbles can flow through the pump and accumulate therein. Accordingly, it cannot be avoided that bubbles which entered the flow paths of these headers grow and cause air lock in the pump, and no measures have been taken against this, whereby the prior art has not considered nor attempted to solve such problems. Moreover, the prior art has not considered removal of air bubbles from a cooling flow path, let alone removal of such air bubbles when used with a portable device which can be positioned in various spatial orientations.

Furthermore, though the radiation header 114 in contact with the wall of the metallic casing 116 can be attached to the metallic casing 116 with a thermal compound or a highly thermal-conductive silicon rubber held between them, or can be directly attached to the metallic casing 116 by screwing or the like, the radiation header 114 has poor heat transfer efficiency and its cooling capability is limited. It may be considered to increase the radiation area to enhance the cooling capability, but simply increasing the area also extends the flow path and increase the quantity of circulation and size of the various components, resulting in an increased possibility of air lock and a shorter life while at the same time increasing the size of the apparatus (e.g., box-shaped radiator is made larger, interfering with the spacing within the computer and its circuitry). The increase in quantity of circulation leads to increase in weight, which is counter to the goal of reducing weight, for example, in smaller portable computers. Therefore, for the radiation header 114 of the second cooling apparatus, the increase in radiation area to enhance the thermal conductivity has contradictory effects.

Conventionally, no measures can be taken against air lock. In fact, it has been considered difficult to use a cooling apparatus of this type in an electronic equipment which is used in various postures like a notebook model personal computer. This is because inherent movement of a portable computer into various positions facilitates movement of air bubbles into the flow passageway so as to increase the concentration therein, whereby accumulation of air bubbles in the pump may increase so as to increase the chances of air-lock. Even if this cooling apparatus is employed, the intended small size, light weight and reduced thickness must be sacrificed. As the capability of CPU is improving as in recent years and higher cooling capability is demanded, the conventional first and second cooling apparatuses, which has the above-described problems, cannot satisfactorily cope with the reduction in size, weight and thickness of notebook model personal computers nor prevent air-lock resulting from air bubble formation in the fluid passageway.

SUMMARY OF THE INVENTION

Thus, it is an object of the present invention to provide a cooling apparatus for electronic equipment which enables improvement in efficiency of heat exchange and prevention of air lock.

It is another object of the present invention to provide a cooling apparatus for electronic equipment which enables reduction in size, weight and thickness and has a simple structure.

In order to achieve the foregoing objects, in a cooling apparatus for electronic equipment according to the present invention, an internal circulation path constituting a part of a closed circulation path is provided in a radiator, and at least said internal circulation path and a reserve tank are formed by abutment by joining a radiation board on which curved surfaces as flow path walls of the internal circulation path and the reserved tank are integrally formed, with another radiation board.

Further, a cooling apparatus for electronic equipment according to the present invention includes a reserve tank which can hold cooling medium outside of the fluid passageway so as to provide a mechanism by which air bubbles can be removed from the fluid flow.

Thus, the efficiency in heat exchange can be improved and no air lock is generated. Reduction in size, weight and thickness is made possible and a simple structure enables reduction in cost. Further, the present invention can have particular advantages when used with a portable computer by eliminating air bubbles from the flow path even when the device is positioned in various spatial orientations.

DESCRIPTION OF THE PREFERRED EMBODIMENT

Figure 1:
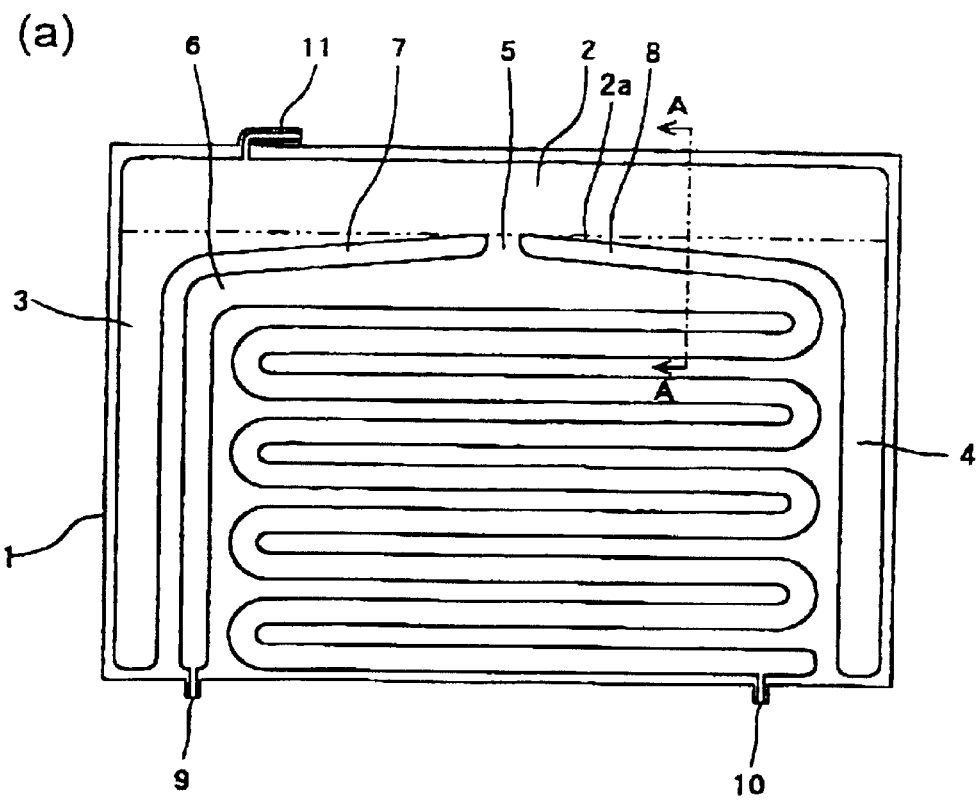
FIG. 1A is an explanatory view showing a radiator of a cooling apparatus for electronic equipment in a first embodiment of the present invention.
FIG. 1B is a cross-sectional view of the radiator of FIG. 1A along a line A-A.
Figure 1:
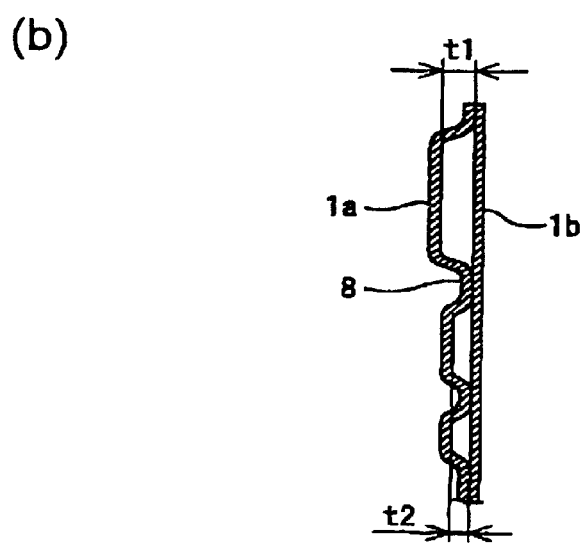

Preferred embodiments of the present invention will now be described with reference to the associated drawings. However, the present invention is not limited to the following embodiments. The following discussion describes only various non-limiting exemplary embodiments of the present invention, through which one of ordinary skill could readily make and use alternative embodiments while still within the scope and spirit of the present invention as recited in the appended claims. In the following embodiments, substantially the same components are denoted by the same reference numerals and duplicate explanation will not be given.

(First Embodiment)

In FIG. 1A, FIG. 1B and FIG. 2A, 1 represents a radiator made of a material having good thermal conductivity such as aluminum, copper or stainless steel, etc., normally a metal plate. 1a represents a flow path wall-forming radiation board (radiation board of the present invention) on which recess parts (curved surfaces of the present invention) are formed as flow path walls by pressing or the like, and 1b represents a flat plate-like flow path wall-forming radiation board (another radiation board of the present invention) which constitutes the radiator 1 by being joined with the flow path wall-forming radiation board 1a. Alternatively, two boards with at least one having internal grooves on a surface thereof can be joined together to form internal flow passages. The flow path wall-forming radiation board 1b may have recess parts formed thereon or may be simply flat. 2 represents a reserve tank for storing a refrigerant for supplement, which can be outside the flow path, and allowing inflow of bubbles while restricting outflow of bubbles when bubbles are mingled in a circulation path 6, which will be described later. 2a represents a tapered bottom surface of the reserve tank 2. The refrigerant is preferably a nonfreezing solution so that the cooling system will not break down because of freezing in a cold district or in winter. 3 represents a first extension reserve tank extended in a direction at right angles from one end of the reserve tank 2, and 4 represents a second extension reserve tank similarly extended from the other end of the reserve tank 2. As shown in FIG. 1B, the reserve tank 2, the first extension reserve tank 3 and the second extension reserve tank 4 are integrated in a U-shape to form a single tank by joining flat parts of the flow path wall-forming radiation boards 1a, 1b. In the first embodiment, the capacity of each of the first extension reserve tank 3 and the second extension reserve tank 4 is set to ½ of the capacity of the reserve tank 2.

5 represents a connection port (bubble outflow limiting path of the present invention) which connects the circulation path 6, later described, with the reserve tank 2 and allows entry of bubbles to the reserve tank 2 but does not allow movement in the opposite direction. In order to allow entry of bubbles and not to allow outflow of bubbles, the connection port 5 is formed so that it has a large radius of curvature on the side of the circulation path 6 and a small radius of curvature on the side of the reserve tank 2 when it is viewed from the front side. Moreover, as will be described later, a step is formed in a direction of internal height (direction of depth when viewed from the front side) on the side of the reserve tank 2. 6 represents a circulation path (internal circulation path of the present invention) formed to be broad and winding so as to increase the radiation area, and 7 represents a first partition provided between the reserve tank 2 and the circulation path 6 and between the first extension reserve tank 3 and the circulation path 6. 8 represents a second partition similarly provided between the reserve tank 2 and the circulation path 6 and between the second extension reserve tank 4 and the circulation path 6.

As shown in FIG. 1B, the second partition 8 is a flat part of the flow path wall-forming radiation board 1a with recess parts formed thereon as flow path inner wall surfaces by pressing or the like, and is joined with a flat part of the flow path wall-forming radiation board 1b by welding or the like. Similarly, the first partition 7, too, is a flat part of the flow path wall-forming radiation board 1a and is joined with a flat part of the flow path wall-forming radiation board 1b by welding or the like. By joining other corresponding flat parts of the flow path wall-forming radiation boards 1a, 1b, at least the circulation path 6, the reserve tank 2 above the circulation path 6, and the first extension reserve tank 3 and the second extension reserve tank 4 in the lateral directions are constituted at a time as an internal space. Since the two flow path wall-forming radiation board 1a, 1b are thus joined to form the flow path walls, the number of components is extremely small and the flow path can be constituted by one process, making it easier to manufacture the radiator. Further, such a construction can reduce the cost and size of the apparatus. The accuracy is high and the radiator 1 can be constituted with light weight and reduced thickness.

Meanwhile, the internal height t1 of the reserve tank 2, the first extension reserve tank 3 and the second extension reserve tank 4 is made larger than the internal height t2 of the circulation path 6. Therefore, at the connection port 5, the above-described small radius of curvature is provided on the side of the reserve tank 2 and a step due to the difference between these internal heights t1, t2 is formed. The first reason for providing the difference between the internal heights t1, t2 in this manner is that the quantity of heat to be radiated to the ambient air from the part of the circulation path 6 need be large. Specifically, the surface area per unit volume of flow of the circulated refrigerant can be increased by reducing the internal height t2 of the circulation path 6. As the quantity of the circulated refrigerant is reduced, the motor output of a pump 24, which will be described later, can be reduced and the motor itself may be small-sized and have a small calorific value. The second reason is that by increasing the capacity of the reserve tank 2, the heat capacity can be increased and can be prevented from varying in accordance with heating within the electronic equipment.

Moreover, the third reason is that bubbles which flowed into the side of the reserve tank 2 must be prevented from flowing out to the side of the circulation path 6. Specifically, for bubbles which have grown in the reserve tank 2 to flow out, they need to move through the connection port 5 while maintaining the surface tension on the interface. If such grown bubbles pass through the connection port 5 having a small internal height and a narrow width, the air blocks the connection port 5 and fine bubbles have large resistance in the direction of outflow due to the shape and the like of the connection port 5. Even though buoyancy acts in the direction of outflow, the buoyancy will not overcome the resistance and the bubbles cannot flow out. It is preferred that the connection port 5 between the reserve tank 2 and the circulation path 6 is provided only at one position so as to secure a gas/liquid separation function.

Meanwhile, on the first partition 7 and the second partition 8 between the reserve tank 2 and the circulation path 6, the bottom surfaces 2a are formed which are inclined obliquely upward toward the connection port 5 at the center when the radiator 1 is stood vertically. Therefore, the width of the circulation path 6 is increased near the connection port 5. This structure facilitates collection and feeding of bubbles from the refrigerant on the side of the circulation path 6 to the side of the reserve tank 2 and makes it more difficult for the bubbles to flow out from the connection port 5 on the side of the reserve tank 2 to the circulation path 6. That is, even when the posture of the radiator 1 is reversed, the taper of the bottom side 2a of the first partition 7 and the second partition 8 has an inverse gradient to the buoyancy acting on the bubbles, and the bubbles usually do not enter the connection port 5. Even if the bubbles enter the connection port 5, the above-described effects of surface tension, viscosity and the like can restrain outflow of the bubbles. These structures enable secure prevention of air lock in the closed circulation path, particularly the pump, which is the most difficult problem in cooling the electronic equipment with the refrigerant.

Figure 9:
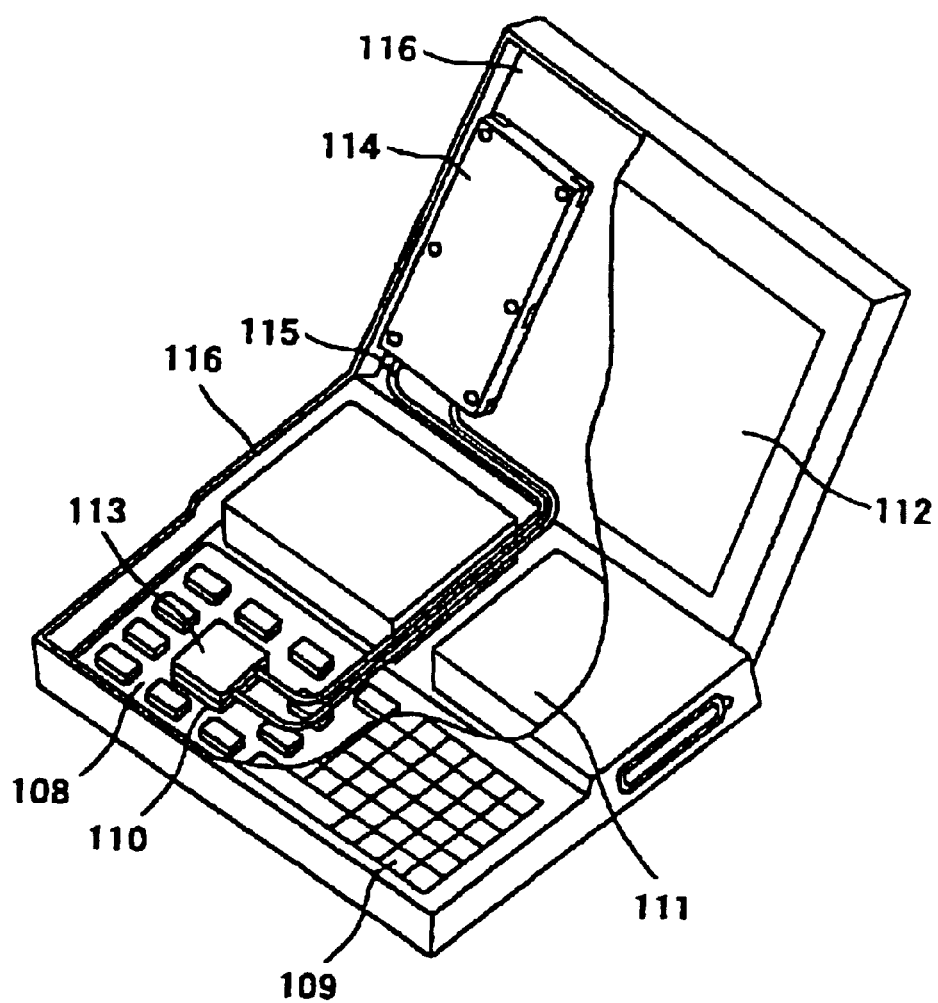
FIG. 9 is a structural view showing a conventional second cooling apparatus for electronic equipment.

In FIG. 1A, 9 represents an inlet, which is an end part on the entrance side of the circulation path 6 in the radiator 1, 10 represents an outlet, which is an end part on the exit side of the circulation path 6 in the radiator 1, and 11 represents a joint. These inlet 9 and outlet 10 are connected to an external circulation path including the pump 24 for feeding the refrigerant, which will be described later. The joint 11 is connected above the reserve tank 2. The joint 11 is closed at the time of normal running and is opened only when filling the refrigerant. Therefore, a stopper such as a rubber cap or the like may be put after filling the refrigerant, or a check valve may be provided in advance. In the first embodiment, the radiator 1 is constituted by joining the flat parts of the flow path wall-forming radiation boards 1a, 1b. Although it may be possible to similarly constitute the radiator by fixing a flat pressed metal pipe to a flat plate-like radiation board, the number of components increases and the accuracy is not secured, making it practically difficult to manufacture the radiator.

Figure 2A:
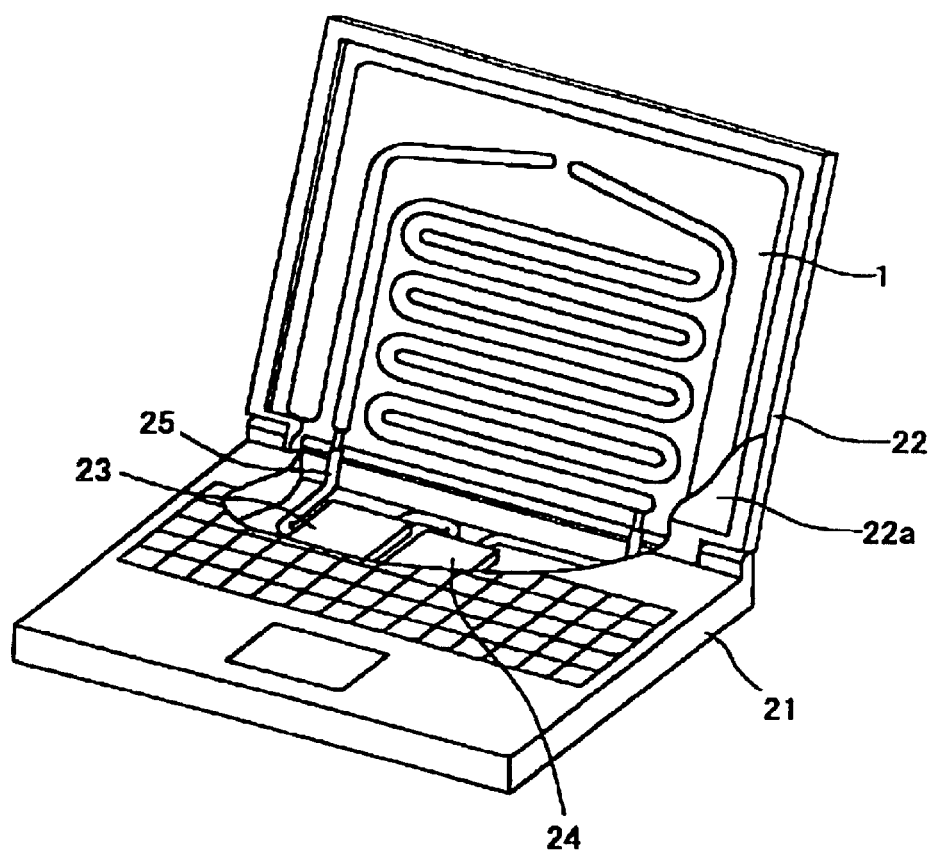
FIG. 2A is a partly broken perspective view showing the case where the cooling apparatus for electronic equipment in the first embodiment of the present invention is incorporated in a notebook model personal computer.

Next, the case where the cooling apparatus of the first embodiment is used in a notebook model personal computer as an electronic equipment will be described. In FIG. 2A, 21 represents a notebook model personal computer body (first casing of the present invention) in which an electronic circuit including a CPU and a storage unit are housed and which has a keyboard provided on its upper side. 22 represents a display part (second casing of the present invention), which is a upper cover in which a liquid crystal display or the like for the notebook model personal computer is housed. 22a represents a display unit such as a liquid crystal display or the like capable of displaying the result of processing by the CPU. The display part 22 is rotatably mounted on the notebook model personal computer body 21. The radiator 1 is provided on the back side of the display unit 22a. The flow path wall-forming radiation board 1b may be exposed without an ornamental board or may be covered with an ornamental board with high thermal conductivity. 23 represents a cooler which is mounted on a heating element (heating component of the present invention) such as the CPU or the like, and in which at least a contact surface for performing heat transfer is made of a metal having good thermal conductivity such as aluminum or stainless steel. In the case of the first embodiment, the circulation path 6 for circulating the refrigerant through the cooler 23 is formed, though not shown in FIG. 2A. 24 represents a pump (circulation pump of the present invention) for forced circulation of the refrigerant, and 25 represents piping which constitutes a closed circulation path.

Although not shown, the pump 24 of the first embodiment is a volute pump (also referred to as Wesco pump, regenerative pump or friction pump). The pump has a ring-shaped impeller having many groove-like blades formed on the outer circumference and a rotor magnet provided on the inner circumference, and a motor stator provided on the inner circumferential side of the rotor magnet, and is driven as the motor stator is electrified. This ring-shaped impeller is housed in a pump casing having an inlet and an outlet. In this pump casing, a cylindrical part is arranged between the motor stator and the rotor magnet, and the rink-shaped impeller is pivotally supported on the cylindrical part so as to be rotatable. Since this pump 24 is small and flat with a small thickness, the cooling apparatus can be reduced in size and thickness. The pump 24 of the first embodiment has a thickness in the direction of its rotation axis of 5 to 10 mm, a representative dimension in the radial direction of 40 to 50 mm, the number of rotations of 1200 rpm, a rate of flow of 0.08 to 0.12 L/minute, and a head of approximately 0.35 to 0.45 m. The allowable dimensions of the pump of the present invention are a thickness of 3 to 15 mm, a radial representative dimension of 10 to 70 mm, a rate of flow of 0.01 to 0.5 L/minute, and a head of approximately 0.1 to 2 m, including the values of the first embodiment. This is a pump of approximately 24 to 28 (unit: m, m$^3$/minute, rpm) in terms of specific speed and is a small and thin pump which is totally different in size from the conventional pumps.

In the first embodiment, the cooler 23 and the pump 24 are separate units connected by the piping 25 as shown in FIG. 2A. However, the pump 24 may be a component which also functions as the cooler 23 by using the above-described volute pump, and this component may be set directly on the CPU or the like, which is the heating component. Such a pump is disclosed in a commonly owned and concurrently filed U.S. Patent application Ser. No. 10/264,265, which application is hereby incorporated by reference. In this case, the pump casing can be prepared by using a metal having high thermal conductivity such as aluminum, copper or stainless steel, etc. Since the lateral side of the pump is flat, it can be set on the CPU or the like. This enables sufficient heat transfer.

The radiator 1, the cooler 23 and the pump 24 connected in series by the piping 25 and are connected with the above-described inlet 9 and outlet 10, thus constituting, together with the circulation path 6, a closed circulation path as a whole. The refrigerant for performing heat exchange is filled in this closed circulation path. In the conventional cooling apparatus, there is a high possibility of air lock unless the air is exhausted completely, whereas in the case of the first embodiment, there is no problem if air is left in the reserve tank 2 and rather some air is partly sealed therein. When the sealed air is moved through the first extension reserve tank 3 and the second extension reserve tank 4 in accordance with the changing postures of the notebook model personal computer, the air collects the scattered fine bubbles into one, and the collected bubble cannot pass through the connection port 5 for the above-described reason with respect to the grown bubbles, thus preventing outflow of the bubble. Moreover, even if the volume of the refrigerant is increased by thermal expansion, the sealed air serves as a cushion and leakage of the liquid from the circulation path and disruption of the circulation path can be prevented.

The operation of the cooling apparatus of the first embodiment will now be described. When the power of the notebook model personal computer is turned on and the heating element such as the CPU need be cooled, a voltage is applied to the pump 24. The pump 24 starts driving and starts circulating the refrigerant through the circulation path. Thus, heat generated from the heating element such as the CPU is transferred to the lower side of the cooler 23 from the contact surface as heat exchange between the cooler 23 and the heating element is carried out. This heat is transferred to the refrigerant in the cooler 23. The refrigerant to which the heat is transferred is transported by the pump to the radiator 1 via the inlet 9. As the refrigerant transported to the radiator 1 is winding through the circulation path 6 in the radiator 1, heat exchange between the refrigerant and the ambient air is carried out and the heat of the refrigerant is radiated. The refrigerant cooled in the radiator 1 passes through the outlet 10 and the piping 25 such as a flexible tube, then transported again to the cooler 23, and performs heat exchange with the heating element again.

Then, a part of the refrigerant is gasified with the lapse of time. The gasified refrigerant is replaced with the atmosphere through the piping 25 and air bubbles mingle in the refrigerant, though the quantity thereof varies depending on the quality of the refrigerant. In the case of the first embodiment, the bubbles mingled in the refrigerant are circulated together with the refrigerant and transported to the circulation path 6 in the radiator 1. Because of buoyancy, the bubbles pass through the circulation path 6 along the first partition 7 to reach the connection port 5, and float up into the reserve tank 2 from the connection port 5, and gas/liquid separation is performed. Also the bubbles staying along the second partition 8 reach the connection port 5 along the second partition 8 because of the effect of buoyancy and enters reserve tank 2 from the connection port 5 so that gas/liquid separation is performed, similarly to when the pump 24 is stopped.

As described above, according to the cooling apparatus of the first embodiment, since the radiator 1 and the reserve tank 2 are integrally arranged as a recess part on the flow path wall-forming radiation board 1a and the flow path wall-forming radiation board 1b and joined with each other by welding or the like, reduction in size, weight and thickness can be realized and the cooling apparatus can be provided at a lower cost.

Moreover, since the width of the circulation path 6 near the connection port 5 is broader, the flow velocity is lowered near the connection port 5 and the bubbles mingled in the refrigerant can be securely captured in the reserve tank. Thus, reduction in rate of flow of circulation and air lock due to intake of bubbles in the pump 24, or reduction in efficiency of heat exchange due to the reduction in rate of flow of circulation and the mingling of bubbles in the refrigerant can be prevented.

Furthermore, since the parts inclined obliquely upward toward the connection port 5 are formed on the first partition 7 and the second partition 8, the bubbles can be led into the reserve tank by the effect of buoyancy even when the pump 24 is not operating. As each of the first extension reserve tank 3 and the second extension reserve tank 4 has a capacity which is ½ of the capacity of the reserve tank and the parts inclined obliquely upward toward the connection port 5 are formed on the first partition 7 and the second partition 8, the air in the reserve tank can be securely held in the reserve tank when the radiator 1 is inclined in any direction.

Figure 2B:
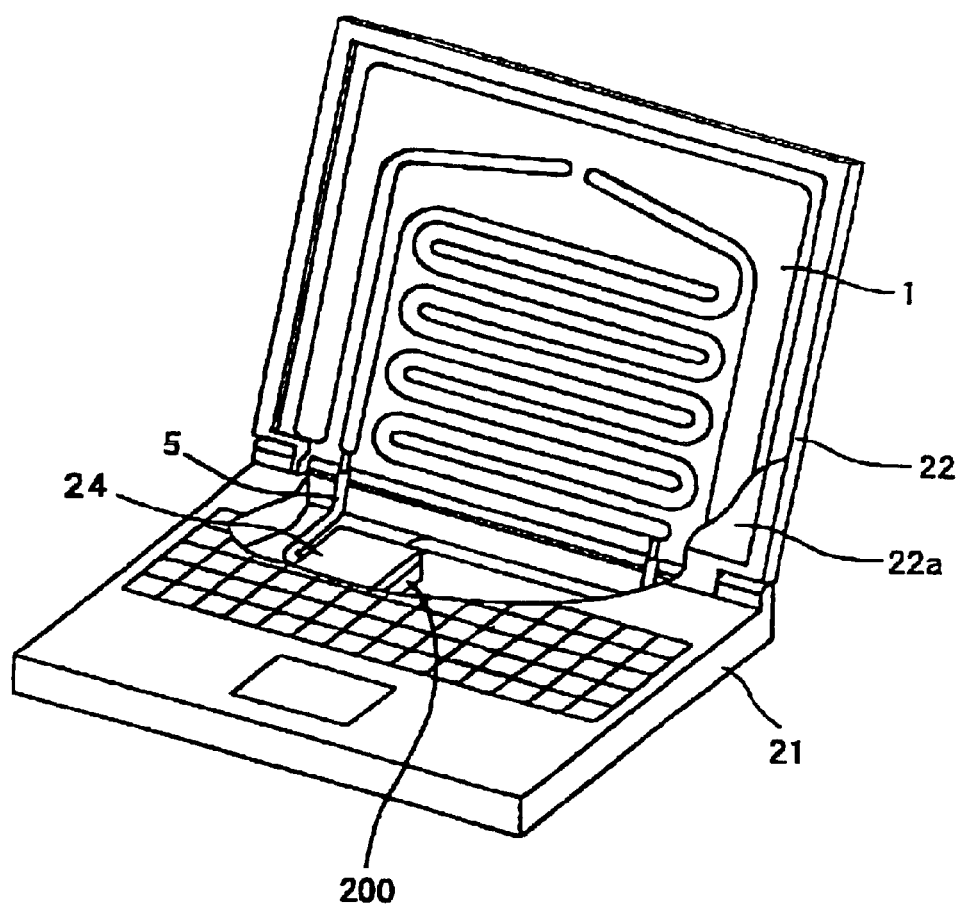
FIG. 2B is a partly broken perspective view showing a modification of the first embodiment of the present invention.

A modification of the first embodiment is shown in FIG. 2B. This modification differs from the first embodiment in that the pump 24 is mounted directly on a heating element 200 via a copper board (not shown) and silicon grease (not shown). The other parts of its structure are the same as those of the first embodiment and therefore will not be described further in detail.

According to this modification of the first embodiment, since the heat of the heating element 200 is directly transferred to the refrigerant in the pump 24 via the housing of the pump 24, the cooling efficiency is improved. Moreover, since no cooler is provided between the pump 24 and the heating element 200, it is possible to reduce the thickness of the notebook model personal computer.

(Second Embodiment)

Figure 3:
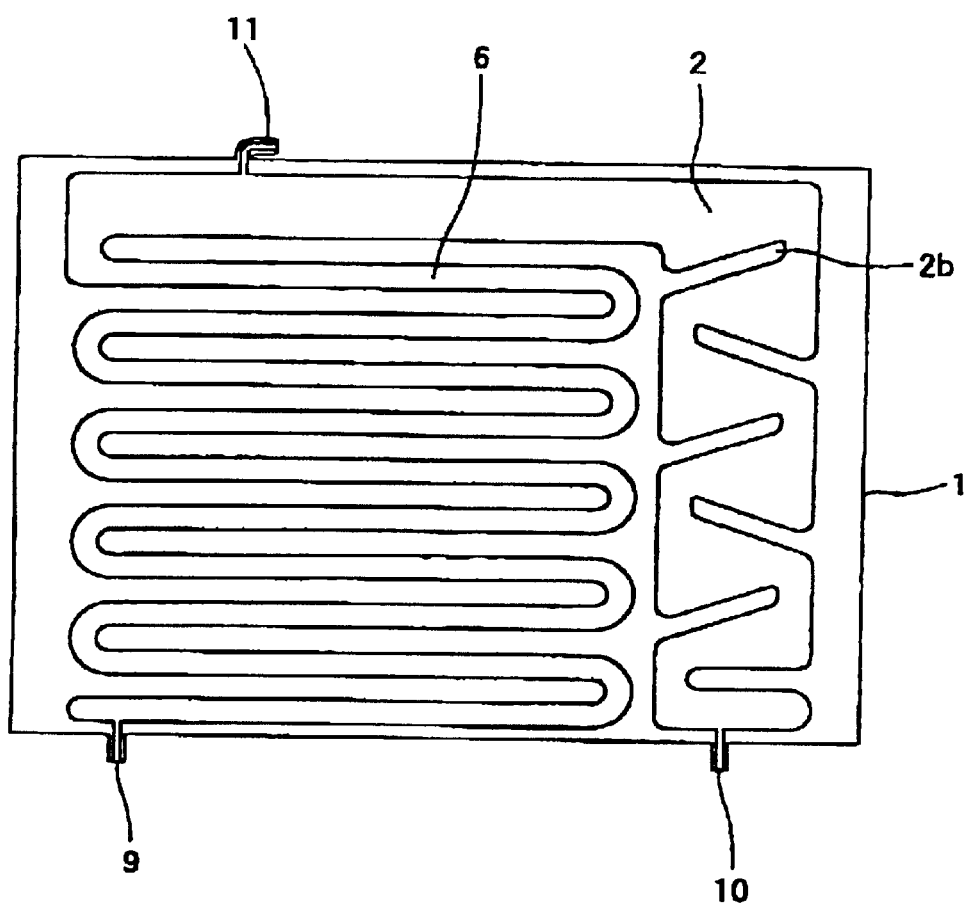
FIG. 3 is an explanatory view showing a radiator of a cooling apparatus for electronic equipment in a second embodiment of the present invention.

FIG. 3 is an explanatory view showing a radiator of a cooling apparatus for electronic equipment in a second embodiment of the present invention.

In FIG. 3, 2b represents baffles projected obliquely upward alternately from both lateral sides in the reserve tank 2. An between these baffles 2b has a small entrance and exit and can form an air stay area therein. Even if air mingles in the refrigerant and the posture is reversed, the air is captured in this stay area and is prevented from moving to the pump side.

The radiator 1 of the second embodiment is integrally constituted by joining the flow path wall-forming radiation board 1a (not shown in FIG. 3) on which a recess part as a flow path wall is formed by pressing or the like and the flat plate-like flow path wall-forming radiation board 1b (not shown in FIG. 3), by welding or the like, similarly to the first embodiment shown in FIG. 1B. The flow path wall-forming radiation boards 1a, 1b are made of metal plates having good thermal conductivity such as aluminum or stainless steel. On the flow path wall-forming radiation board 1a having the recess part, the circulation path 6 and a recess part to be the reserve tank 2 are provided in a reversed L-shape as a whole, at an upper part (in the vertical direction) of the radiator 1 and a part bent into a lateral direction therefrom. In this bent recess part in the lateral direction, flat parts to be the baffles 2b are alternately formed from both sides.

According to the radiator of this second embodiment, since the baffles 2b inclined obliquely upward are alternately arranged on both sides in the reserve tank 2, the refrigerant is winding also in the reserve tank 2, thus improving the efficiency of heat exchange. Liquid and gas are separated by the baffles 2b and inflow of bubbles into the pump 24 (not shown) can be prevented. Moreover, even when the posture of the radiator 1 is vertically reversed, air is captured by the baffles 2b and inflow of bubbles into the pump 24 can be prevented.

(Third Embodiment)

Figure 4:
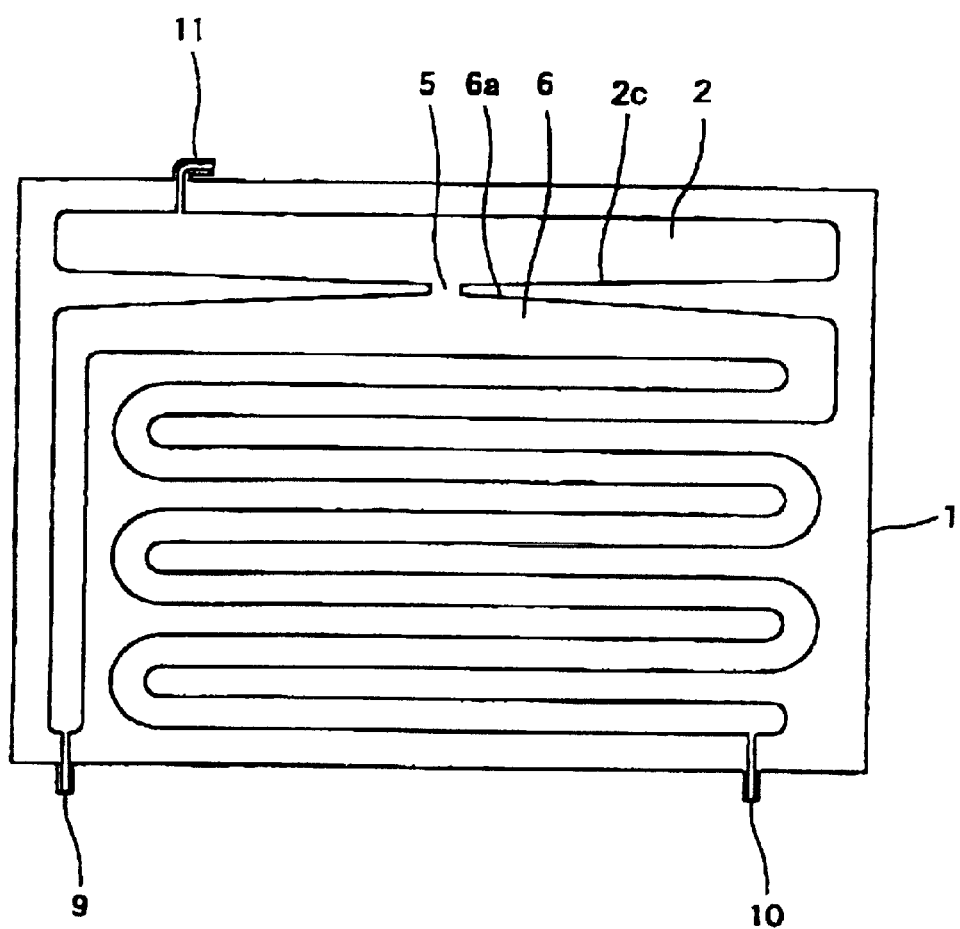
FIG. 4 is an explanatory view showing a radiator of a cooling apparatus for electronic equipment in a third embodiment of the present invention.

FIG. 4 is an explanatory view showing a radiator of a cooling apparatus for electronic equipment in a third embodiment of the present invention. In FIG. 4, 2c represents a tapered bottom surface situated at an upper part (in the vertical direction) of the radiator 1 and formed on the reserve tank 2. The tapered bottom surface 2c is formed to be inclined obliquely downward toward the connection port 5. 6a represents a guide wall formed on the circulation path 6 near the connection port 5 and inclined obliquely upward toward the connection port 5.

As shown in FIG. 4, the radiator 1 of the third embodiment is integrally constituted by joining the flow path wall-forming radiation board 1a (not shown in FIG. 4) on which a recess part as a flow path wall is formed by pressing or the like and the flat plate-like flow path wall-forming radiation board 1b (not shown in FIG. 4), by welding or the like, similarly to the first embodiment shown in FIG. 1B. The flow path wall-forming radiation boards 1a, 1b are made of metal plates having good thermal conductivity such as aluminum or stainless steel. On the flow path wall-forming radiation board 1a having the recess part, the reserve tank 2 is branched out from the circulation path 6 and a flat part is formed so that a recess part which constitutes the bottom surface 2c is inclined toward the connection port 5 while a flat part is formed so that the guide wall 6a is inclined obliquely upward.

According to this third embodiment, since the bottom surface of the reserve tank 2 is inclined obliquely downward toward the connection port 5, the refrigerant can be supplied to the circulation path 6 efficiently and securely. Moreover, since the upper surface of the circulation path 6 adjacent to the reserve tank 2 is inclined obliquely upward toward the connection port 5, bubbles can be guided into the reserve tank 2 by the effect of buoyancy even when the pump 24 (not shown in FIG. 4) is not operating. The bubbles which once entered the reserve tank 2 will not return to the side of the circulation path 6 for the above-described reason.

(Fourth Embodiment)

Figure 5:
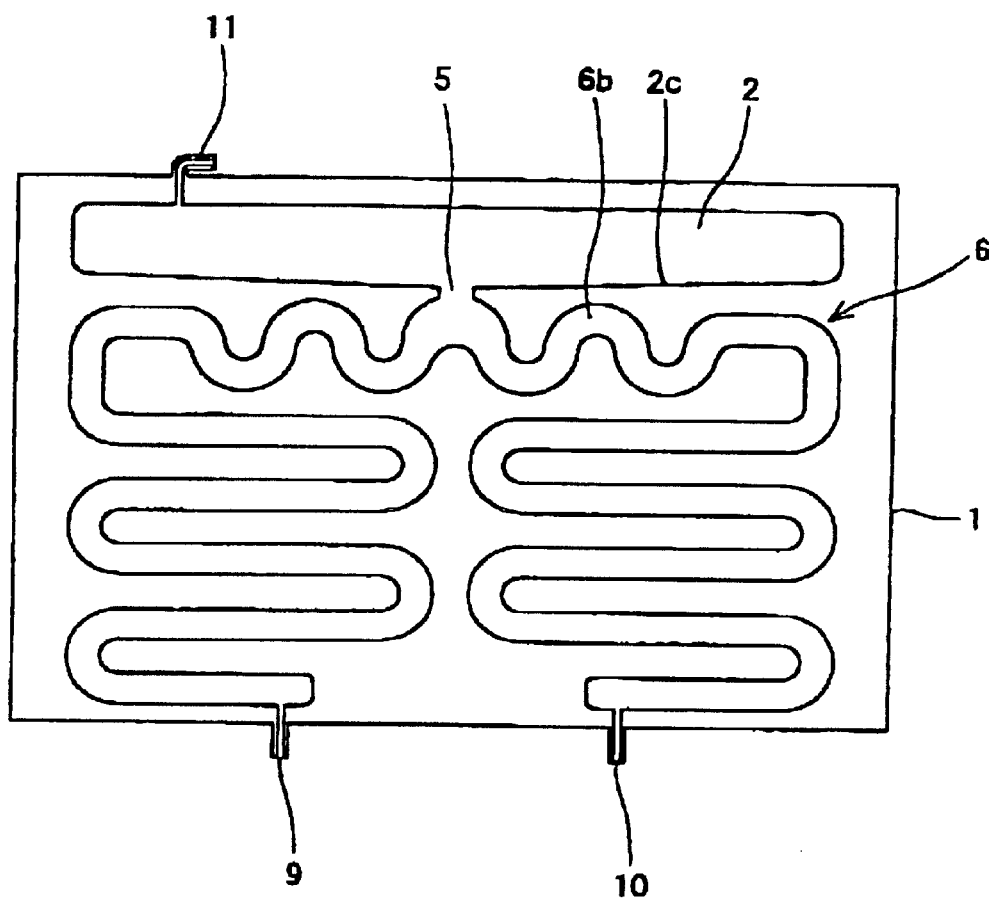
FIG. 5 is an explanatory view showing a radiator of a cooling apparatus for electronic equipment in a fourth embodiment of the present invention.

FIG. 5 is an explanatory view showing a radiator of a cooling apparatus for electronic equipment in a fourth embodiment of the present invention. In FIG. 5, 6b represents a winding path provided in the circulation path 6 near the connection port 5. This winding path 6b enables prevention of outflow of a large quantity of gas to the pump 24 (not shown in FIG. 5) from the circulation path 6 even if the posture of the radiator 1 is reversed when the pump is stopped.

As shown in FIG. 5, the radiator 1 of the fourth embodiment is integrally constituted by joining the flow path wall-forming radiation board 1a (not shown in FIG. 5) on which a recess part as a flow path wall is formed by pressing or the like and the flat plate-like flow path wall-forming radiation board 1b (not shown in FIG. 5), by welding or the like, similarly to the first embodiment shown in FIG. 1B. The flow path wall-forming radiation boards 1a, 1b are made of metal plates having good thermal conductivity such as aluminum or stainless steel. On the flow path wall-forming radiation board 1a having the recess part, the reserve tank 2 is branched out from the circulation path 6 at an upper position (in the vertical direction) in the radiator 1 and its bottom surface 2c is inclined obliquely downward toward the connection port 5. The circulation path width of the winding path 6b is made broader right below the connection part 5 than at other parts.

According to the radiator 1 of this fourth embodiment, since the bottom surface 2c of the reserve tank 2 is inclined obliquely downward toward the connection port 5, the refrigerant can be supplied to the circulation path 6 efficiently and securely. Moreover, since the winding path 6b near the connection port 5 is winding along the bottom surface 2c, even if the posture of the radiator 1 is vertically reversed when the pump is stopped, outflow of a large quantity of gas to the side of the pump 24 (not shown in FIG. 5) from the circulation path 6 can be prevented, and reduction in rate of flow of circulation, air lock and the like at the time when the pump is operating can be prevented. The bubbles which once entered the reserve tank 2 will not return to the side of the circulation path 6 for the above-described reason.

(Fifth Embodiment)

Figure 6:
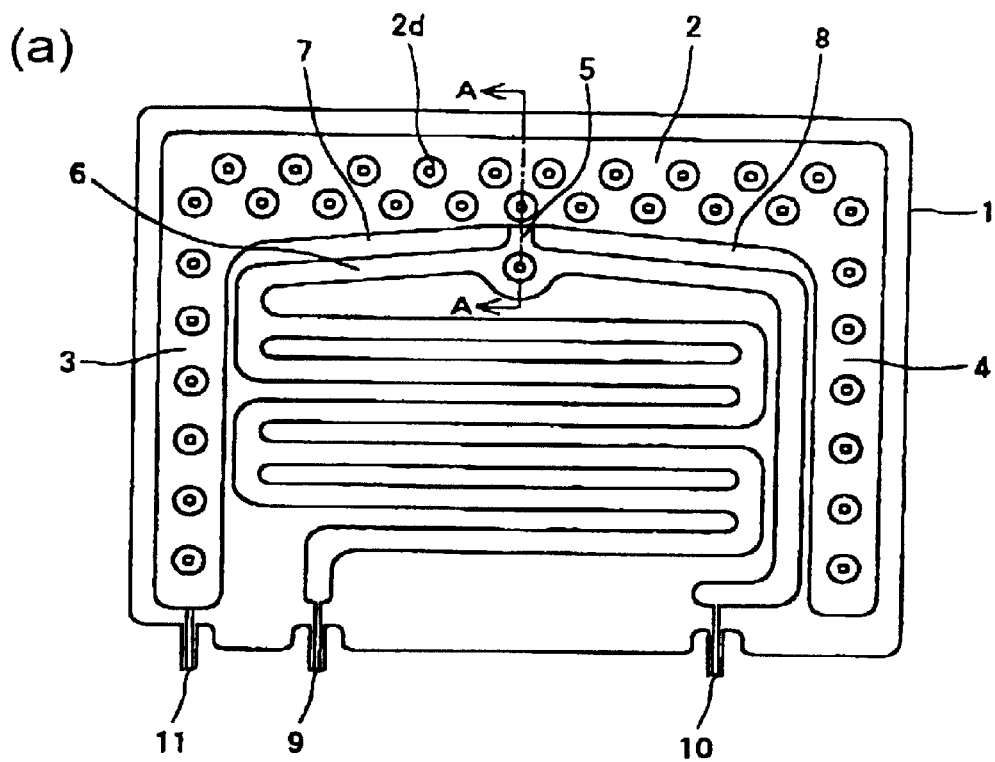
FIG. 6A is an explanatory view showing a radiator of a cooling apparatus for electronic equipment in a fifth embodiment of the present invention.
FIG. 6B is a cross-sectional view of the radiator of FIG. 6A along a line A-A.
Figure 6:
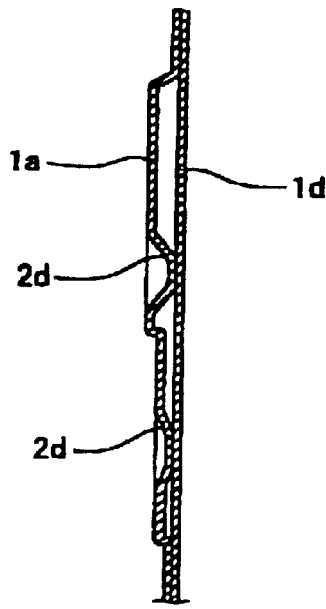

FIG. 6A is an explanatory view showing a radiator of a cooling apparatus for electronic equipment in a fifth embodiment of the present invention. FIG. 6B is a cross-sectional view of the radiator of FIG. 6A along a line A-A. The same components as in the first embodiment are denoted by the same numerals and will not be described further in detail.

In FIG. 6A and 6B, 2d represents dimples provided at constant intervals in the reserve tank 2. These dimples 2d are provided in the radiator 1, particularly in the reserve tank 2 having a large area. The dimples 2d are also provided in the circulation path 6 and the reserve tank 2 near the connection port 5.

The radiator 1 of the fifth embodiment is integrally constituted by joining the flow path wall-forming radiation board 1a on which a recess part as a flow path wall is formed by pressing or the like and the flat plate-like flow path wall-forming radiation board 1b, by welding or the like, similarly to the first embodiment shown in FIG. 1B. As shown in FIG. 6B, many dimples 2d protruding from the flow path wall-forming radiation board 1a are formed and joined with the flow path wall-forming radiation board 1b by welding or the like. However, the dimples 2d may be formed on the flow path wall-forming radiation board 1b or on both of the flow path wall-forming radiation board 1a and the flow path wall-forming radiation board 1b. The flow path wall-forming radiation boards 1a, 1b are made of metal plates having good thermal conductivity such as aluminum or stainless steel. On the flow path wall-forming radiation board 1a having the recess part as a flow path wall and the dimples 2, the circulation path 6 is formed to intersect the recess part to be the reserve tank 2, and at both ends of the reserve tank 2, the first extension reserve tank 3 and the second extension reserve tank 4 are extended in directions at right angles to the reserve tank 2 so that these extension reserve tanks and the reserve tank 2 form a U-shape.

According to this fifth embodiment, since the dimples 2d are provided in the radiator 1, particularly in the reserve tank 2 having a large area, deformation and damage of the radiator 1 due to increase in internal pressure of the radiator 1 can be prevented. Since the dimples 2d are also provided in the circulation path 6 and the reserve tank 2 near the connection port 5, outflow of bubbles to the circulation path 6 from the reserve tank 2 can be prevented. Even if bubbles flow out to the circulation path 6, the bubbles are fragmented by the dimples 2d and air lock of the pump can be prevented.

(Sixth Embodiment)

Figure 7:
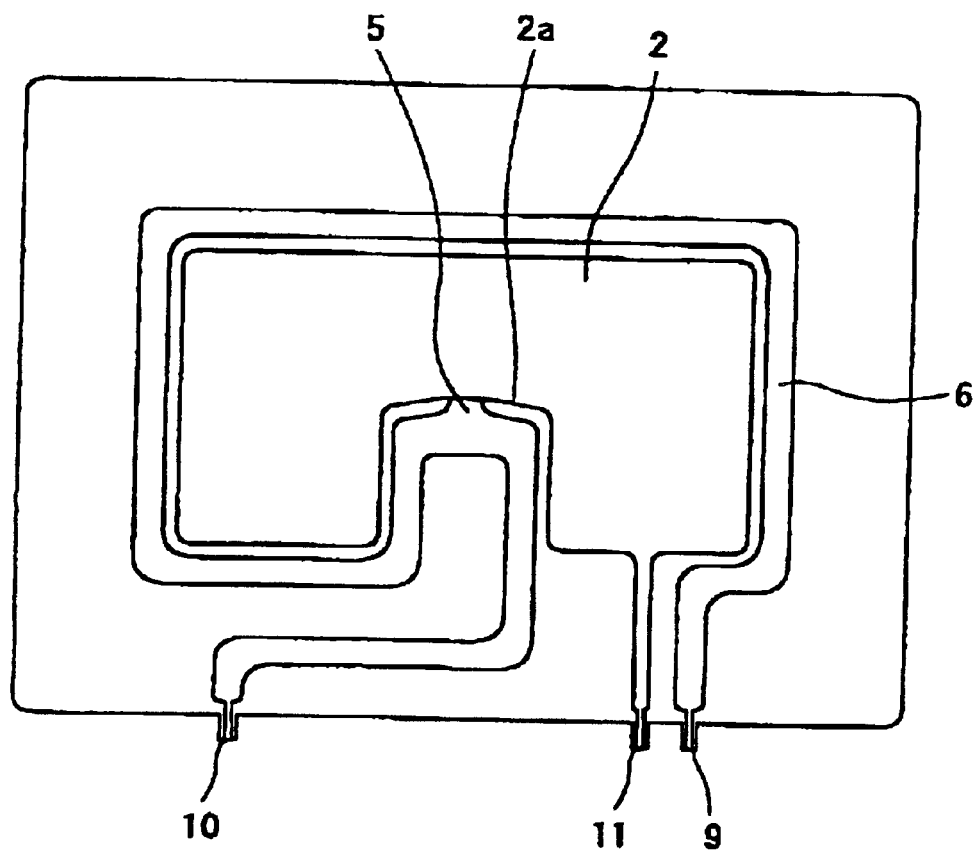
FIG. 7 is an explanatory view showing a radiator of a cooling apparatus for electronic equipment in a sixth embodiment of the present invention.
Figure 8:
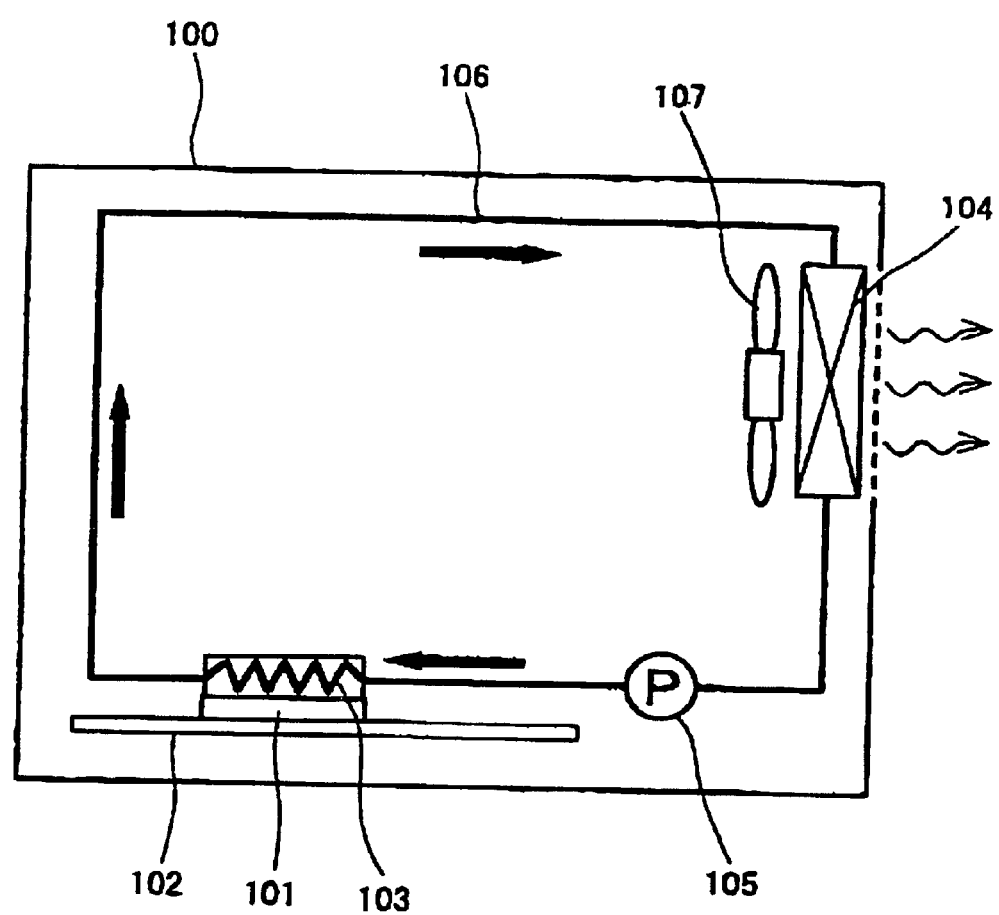
FIG. 8 is a structural view showing a conventional first cooling apparatus for electronic equipment.

FIG. 7 is an explanatory view showing a radiator of a cooling apparatus for electronic equipment in a sixth embodiment of the present invention. The same components as in the first embodiment are denoted by the same numerals and will not be described further in detail.

In FIG. 7, the reserve tank 2 is situated at the center of the radiator 1 and the circulation path 6 is provided at a position surrounding the outer side of the reserve tank 2. The circulated refrigerant is circulated through the outer circumference of the reserve tank 2, then passes through a central part of the radiator 1 and flows out from the radiator 1.

As shown in FIG. 7, the radiator 1 of the sixth embodiment is integrally constituted by joining the flow path wall-forming radiation board 1a (not shown in FIG. 7) on which a recess part as a flow path wall is formed by pressing or the like and the flat plate-like flow path wall-forming radiation board 1b (not shown in FIG. 7), by welding or the like, similarly to the first embodiment shown in FIG. 1B. The flow path wall-forming radiation boards 1a, 1b are made of metal plates having good thermal conductivity such as aluminum or stainless steel. On the flow path wall-forming radiation board 1a, the recess part for constituting the reserve tank 2 is formed at the center of the radiator 1 to intersect the circulation path 6, and its bottom surface 2a is inclined obliquely upward toward the connection port 5.

According to the radiator 1 of this sixth embodiment, since the reserve tank 2 is situated at the center of the radiator 1, good weight balance of the radiator 1 is realized. For example, when the radiator 1 is housed in an upper cover of a notebook model personal computer in which a liquid crystal display or the like is housed, instability in weight balance and falling or the like of the notebook model personal computer body can be prevented. Moreover, since the thickness near the outer circumference of the radiator 1 can be reduced, a design shape which does not look thick can be realized. Furthermore, since the refrigerant passes through the outer circumferential side of the reserve tank 2, even if the circulation path 6 cannot be provided near the outer circumference of the radiator 1 for dimensional reasons, heat can be dispersed in a broad range and the radiation efficiency can be improved.

As described above, according to the embodiments of the cooling apparatus for electronic equipment of the present invention, since at least the internal circulation path and the reserve tank are formed by integrally joining radiation boards having a curved surface, an inexpensive cooling apparatus can be realized in which reduction in size, thickness and cost can be easily realized and which is easily assembled with a small number of components.

In addition to the function for supplementing the refrigerant to the reserve tank, the gas/liquid separation function for performing gas/liquid separation of mingled bubbles and isolating the bubbles from the closed circulation path can be provided. Therefore, reduction in efficiency of heat exchange and air lock of the pump due to the bubbles can be prevented.

Since the reserve tank is provided in an upper part of the radiator, bubbles in the internal circulation path are captured in the reserve tank. Therefore, reduction in efficiency of heat exchange and air lock of the pump or the like due to the bubbles can be prevented, and a cooling apparatus with high reliability can be provided.

Since the bubble outflow limiting path from the internal circulation path to the reserve tank in the radiator is provided at one position, bubbles which are once captured can be securely caused to stay in the reserve tank. Moreover, as a pressure is applied to the part near the bubble outflow limiting path during the operation of the pump, outflow of the gas in the reserve tank into the closed circulation path can be prevented even if the radiator is turned upside down. Therefore, reduction in efficiency of heat exchange and air lock of the pump or the like due to the bubbles can be prevented, and a cooling apparatus with high reliability can be provided.

Since the bottom surface of the reserve tank is inclined obliquely downward toward the bubble outflow limiting path, the refrigerant can be supplied to the internal circulation path efficiently and securely.

As the cross-sectional area of the internal circulation path of the radiator increases near the connection port, the flow velocity near the bubble outflow limiting path is lowered and the bubbles can be securely guided into the reserve tank. Therefore, reduction in efficiency of heat exchange and air lock of the pump or the like due to the bubbles can be prevented, and a cooling apparatus with high reliability can be provided.

As the upper surface of the internal circulation path of the radiator which is adjacent to the lower side of the reserve tank is inclined obliquely upward toward the bubble outflow limiting path, the bubbles can be securely guided to the bubble outflow limiting path whether the pump is operating or stopped. Therefore, reduction in efficiency of heat exchange and air lock of the pump or the like due to the bubbles can be prevented, and a cooling apparatus with high reliability can be provided.

Since the internal circulation path of the radiator near the bubble outflow limiting path is winding, only a small quantity of bubbles flow out to the circulation path even if the radiator is turned upside down when the pump is stopped. Therefore, reduction in rate of flow of circulation and air lock at the time when the pump is operating can be prevented, and a cooling apparatus with high reliability can be provided.

As the first extension reserve tank and the second extension reserve tank are provided to face downward at both ends of the reserve tank, the gas in the reserve tank is captured in the first extension reserve tank and the second extension reserve tank and outflow of the gas to the closed circulation path can be prevented even if the radiator is turned upside down when the pump is stopped. Therefore, reduction in efficiency of heat exchange and air lock of the pump or the like due to the bubbles can be prevented, and a cooling apparatus with high reliability can be provided.

As each of the first extension reserve tank and the second extension reserve tank has a capacity which is ½ of the capacity of the reserve tank, outflow of the gas in the reserve tank into the internal circulation path can be prevented even if the radiator is turned 90 degrees. Therefore, reduction in efficiency of heat exchange and air lock of the pump or the like due to the bubbles can be prevented, and a cooling apparatus with high reliability can be provided.

Since the strength is improved by providing dimples in the reserve tank having a large area, deformation and damage of the radiator due to a rise in internal pressure of the radiator at the time of abnormality can be prevented and the flow path wall-forming radiation board can be made thinner, thus enabling realization of reduction in weight and cost. Moreover, since the dimples are provided in the circulation path and the reserve tank near the connection port, it is possible to prevent outflow of the bubbles to the circulation path from the reserve tank and fragment the bubbles, thus enabling air lock of the pump.

Since the bottom surface of the reserve tank is inclined obliquely upward toward the bubble outflow limiting path, the bubbles in the reserve tank can be securely guided to the first extension reserve tank and the second extension reserve tank even if the radiator is turned upside down.

The baffles can fragment the flowing bubbles and perform gas/liquid separation. Moreover, even if the radiator is turned upside down, the bubbles are captured by the baffles and can be prevented from flowing out to the pump. Furthermore, since the flow path is winding, the radiation efficiency is improved.

As the internal height of the reserve tank is larger than the internal height of the internal circulation path of the radiator, the capacity of the reserve tank can be increased. Even if the radiator is horizontally positioned, the step formed by the difference between the internal heights enables prevention of outflow of the bubbles in the reserve tank to the internal circulation path.

Since a joint is provided at least one position or more in the reserve tank, it can be used as a filling port for filling the refrigerant to the closed circulation path or as an air exhaust port. As the joint has a check valve, the work to seal the joint after filling the refrigerant to the closed circulation path is not necessary. As a volute pump is used, the entire cooling apparatus can be reduced in size and thickness.

Since the reserve tank is situated at the center of the radiator, better weight balance of the radiator is realized and falling or the like can be prevented. Moreover, heat can be dispersed in a broad range and the radiation efficiency can be improved.

The cooling apparatus can be housed in an electronic equipment such as a notebook model personal computer which has strict limitations to the installation space, and a greater quantity of heat can be cooled. As the radiator is arranged on the back side of the display device, the entire back side of the display device can be used in an electronic equipment such as a notebook model personal computer which has strict limitations to the installation space, and efficient cooling can be performed without increasing the thickness. Since a nonfreezing solution is used as the refrigerant, freezing of the refrigerant and hence breakdown of the cooling system can be prevented even in a cold district.

What is claimed is:

1. A radiator, comprising:
   a fluid inlet;
   a fluid outlet, and
   a fluid passageway through which a cooling medium is adapted to flow from said fluid inlet to said fluid outlet, said radiator including a reserve tank fluidly coupled to said fluid passageway for storing cooling medium outside of said fluid passageway; and a fluid-resistive connection port positioned outside of said fluid passageway for connecting said reserve tank to said fluid passageway.

2. The radiator of claim 1, wherein said reserve tank is arranged and dimensioned so as to be capable of holding air bubbles which were diverted out of said fluid passageway and, in any spatial orientation of said radiator, restricting the return of the air bubbles held in said reserve tank back into the fluid passageway.

3. The radiator of claim 1, wherein a portion of said fluid passageway adjacent said connection port has an increased cross-sectional area relative to other portions of said fluid passageway.

4. The radiator of claim 1, further comprising a protrusion in said fluid passageway positioned adjacent said connection port.

5. The radiator of claim 1, further comprising a protrusion in said reserve tank positioned adjacent said connection port.

6. The radiator of claim 1, wherein a step in positioned at an interface between said connection port and said reserve tank.

7. The radiator of claim 1, further comprising a bump positioned in said connection port adjacent said reserve tank.

8. The radiator of claim 1, further comprising at least one protrusion in said reserve tank.

9. The radiator of claim 1, wherein said connection port is arranged as a bi-directional flow passage.

10. The radiator of claim 1, wherein a wall portion of said fluid passageway extending to said connection port is angled with respect to said connection port such that air bubbles in said cooling medium are guided into said connection port.

11. The radiator of claim 1, wherein a wall portion of said reserve tank extending to said connection port is angled with respect to said connection port such that air bubbles held in said reserve tank are guided away from said connection port.

12. The radiator of claim 1, wherein at least one of a first end of said connection portion adjacent said fluid passageway and a second end of said connection port adjacent said reserve tank is curved.

13. The radiator of claim 1, wherein a first end of said connection port adjacent said fluid passageway is curved with a first radius of curvature and a second end of said connection port adjacent said reserve tank is curved with a second radius of curvature, said first radius of curvature is greater than said second radius of curvature.

14. The radiator of claim 1, wherein said reserve tank is arranged and dimensioned so as to contain an air gap in any spatial orientation of said radiator.

15. The radiator of claim 1, further comprising a single connection port for connecting said reserve tank to said fluid passageway such that only one fluid path exists between said fluid passageway and said reserve tank.

16. The radiator of claim 1, wherein a direction of flow through said connection port intersects a direction of flow through said fluid passageway.

17. The radiator of claim 1, wherein an internal height of said reserve tank is greater than an internal height of said fluid passageway.

18. The radiator of claim 1, further comprising a first and second extension reserve tank which are angled relative to said reserve tank, said first and second extension reserve tanks each having ½ the capacity of the reserve tank.

19. The radiator of claim 1, wherein at least one wall portion of said reserve tank includes at least one baffle extending therefrom.

20. The radiator of claim 1, wherein a wall portion of said reserve tank extending to said connection port is angled with respect to said connection port such that cooling medium stored in said reserve tank is guided into said connection port.

21. The radiator of claim 1, wherein a portion of said fluid passageway adjacent said connection port forms a winding path.

22. The radiator of claim 1, wherein said reserve tank is positioned at the center of said radiator and is surrounded by said fluid passageway.

23. The radiator of claim 1, wherein said reserve tank includes a sealable opening for filling the reserve tank with cooling medium.

24. The radiator of claim 1, wherein said reserve tank includes a plurality of overlapping baffles extending alternately from opposing wall portions of said reserve tank.

25. The radiator of claim 1, further comprising at least one extension reserve tank which is angled relative to said reserve tank, said reserve tank is positioned on a first side of said connection port and said fluid passageway is positioned on a second side of said connection port opposite to said first side, at least a portion of said at least one extension reserve tank extending into said second side.

26. The radiator of claim 1, further comprising two radiator boards having good thermal conductivity coupled together whereby at least one of facing surfaces of the coupled radiator boards are configured so as to form patterned space between said facing surfaces, said patterned space forming at least one of said fluid passageway and said reserve tank.

27. A lap-top computer having a cooling apparatus coupled thereto, said cooling apparatus including a radiator as recited in claim 1, wherein said radiator is coupled to the back side of the display device of said lap-top computer.

28. A cooling apparatus including a radiator as recited in claim 1, said cooling apparatus further comprising a cooler and a circulation pump provided in a closed circulation path for circulating the cooling medium, said cooler removing heat from a heating element by using said cooling medium, said radiator radiating the removed heat.

29. A cooling apparatus including a radiator as recited in claim 1, said cooling apparatus further comprising a pump coupled to said radiator for pumping cooling medium through said fluid passageway and a pump casing for housing said pump, said pump casing including a heat-conducting portion having high thermal conductivity adapted to contact a heat-generating element.

30. The radiator of claim 1, wherein the radiator and the reserve tank are integrally formed.

31. The radiator of claim 1, wherein the radiator and the reserve tank are formed by joining at least a pair of radiation boards.

32. The radiator of claim 4, wherein said protrusion is positioned in said fluid passageway so as to divide said fluid passageway into two flow paths around said protrusion.

33. The radiator of claim 14, wherein said reserve tank is arranged and dimensioned such that air bubbles held in said reserve tank flow toward said air gap in any spatial orientation of said radiator.

34. The radiator of claim 21, wherein a part of said portion extending to said connection port includes a concave wall portion facing the fluid passageway.

35. The radiator of claim 23, further comprising one of a cap and a check valve coupled to said opening for selectively sealing said opening.

36. The lap-top of claim 27, wherein said cooling apparatus further comprises a pump coupled to said radiator for pumping cooling medium through said fluid passageway, said pump being thermally directly connected to an electronic component of said lap-top.

37. The cooling apparatus of claim 28, wherein said fluid passageway constitutes a part of said closed circulation path, and
at least one of said fluid passageway and said reserve tank are formed by abutment by joining a radiation board on which curved surfaces as flow path walls of the internal circulation path and the reserve tank are integrally formed, with another radiation board.

38. A cooling apparatus of claim 29, wherein said heat-conducting portion is made of one of aluminum, copper, and stainless steel.

39. The cooling apparatus of claim 37, wherein said fluid passageway and said reserve tank are connected by a bubble outflow limiting path for limiting movement of mingled bubbles in one direction.

40. The cooling apparatus of claim 37, wherein said reserve tank is provided in an upper part of said radiator.

41. The cooling apparatus of claim 37, wherein a first extension reserve tank and a second extension reserve tank which extend downward are provided at both ends of said reserve tank.

42. The cooling apparatus of claim 37, wherein dimples are formed on the radiation board constituting said reserve tank and connect the two radiation boards.

43. The cooling apparatus of claim 37, wherein said reserve tank is arranged in an upward direction and in a lateral direction of said radiator, and baffles inclined obliquely upward are alternately arranged on both lateral sides in said reserve tank.

44. The cooling apparatus of claim 37, wherein said reserve tank has an internal height greater than the internal height of the fluid passageway.

45. The cooling apparatus of claim 37, wherein a joint is provided at least one position on said reserve tank.

46. The cooling apparatus of claim 37, wherein said pump is a volute pump comprising a ring-shaped impeller which has many blades formed omits outer circumference and a rotor magnet provided on its inner circumference, a motor stator provided on the inner circumferential side of said rotor magnet, and a pump casing which has a cylindrical part formed therein to be arranged between said motor stator and said rotor magnet, houses said impeller therein and has an inlet and an outlet, said cylindrical part pivotally supporting said ring-shaped impeller so that said ring-shaped impeller is rotatable.

47. The cooling apparatus of claim 37, further comprising an electronic equipment having a first casing in which an electronic circuit including a central processing unit and a storage unit are housed and which has a keyboard provided on its upper side, and a second casing having a display device capable of displaying the result of processing by said central processing unit, said second casing being rotatably mounted on said first casing.

48. The cooling apparatus of claim 37, wherein said cooling medium is a nonfreezing solution.

49. The cooling apparatus of claim 39, wherein said bubble outflow limiting path is provided at one position.

50. The cooling apparatus of claim 39, wherein the bottom surface of said reserve tank is inclined obliquely downward toward said bubble outflow limiting path.

51. The cooling apparatus of claim 39, wherein the cross-sectional area of the fluid passageway increases near said bubble outflow limiting path.

52. The cooling apparatus of claim 39, wherein the upper surface of the fluid passageway adjacent to the lower part of said reserve tank is inclined obliquely upward toward said bubble outflow limiting path.

53. The cooling apparatus of claim 39, wherein the fluid passageway is winding near said bubble outflow limiting path.

54. The cooling apparatus of claim 39, wherein the bottom surface of said reserve tank is inclined obliquely upward toward said bubble outflow limiting path.

55. The cooling apparatus of claim 39, wherein said fluid passageway and said reserve tank are connected with each other by the bubble outflow limiting path, and said fluid passageway surrounds said reserve tank.

56. The cooling apparatus of claim 41, wherein each of said first extension reserve tank and said second extension reserve tank has a capacity which is ½ of the capacity of said reserve tank.

57. The cooling apparatus of claim 45, wherein said joint has a check valve.

58. The cooling apparatus of claim 47, wherein the radiator is arranged on the back side of the display device of said second casing.

59. A cooling apparatus for electronic equipment comprising:
a closed circulation path for circulating a refrigerant;
a circulation pump for circulating said refrigerant;
a reserve tank for storing said refrigerant; and
a radiator for radiating heat removed from a heating component by said refrigerant;
said radiator, said reserve tank and a part of said closed circulation path being formed by joining at least a pair of radiation boards.

60. The cooling apparatus of claim 59, wherein said reserve tank is provided in an upper part of said radiator.

61. The cooling apparatus of claim 59, wherein said circulation pump is thermally directly connected with said heating component.

62. The radiator of claim 59, wherein an internal height of the reserve tank is greater than an internal height of a part of the closed circulation path included in the radiator.

63. The radiator of claim 59, wherein the reserve tank is provided in an upper part of the closed circulation path of the radiator when said electronic equipment in use.

64. The cooling apparatus of claim 60, wherein an inclined surface is provided on the bottom surface of said reserve tank.

65. The cooling apparatus of claim 61, wherein a copper board is provided between said circulation pinup and said heating component.

66. The cooling apparatus of claim 64, wherein a hole for guiding bubbles in said refrigerant into said reserve tank is provided at least at a part of said inclined surface.

67. The cooling apparatus of claim 66, wherein said circulation pump is thermally directly connected with said heating component.

68. The cooling apparatus of claim 67, wherein a copper board is provided between said circulation pump and said heating component.

69. A radiator, comprising:
a fluid inlet;
a fluid outlet; and
a fluid passageway through which a cooling medium is adapted to flow from said fluid inlet to said fluid outlet, said radiator further comprising two radiator boards having good thermal conductivity coupled together whereby at least one of facing surfaces of the coupled radiator boards are configured so as to form patterned space between said facing surfaces, said patterned space forming said fluid passageway.

70. The radiator of claim 69, wherein at least one of said two radiator boards is made of aluminum, copper, or stainless steel.

71. The radiator of claim 69, wherein said two radiator boards are welded together.

72. A radiator, comprising:

a fluid inlet;

a fluid outlet;

a fluid passageway through which a cooling medium is adapted to flow from said fluid inlet to said fluid outlet, said radiator including a reserve tank fluidly coupled to said fluid passageway for storing cooling medium outside of said fluid passageway; and a connection port for connecting said reserve tank to said fluid passageway, wherein at least one of a first end of said connection portion adjacent said fluid passageway and a second end of said connection port adjacent said reserve tank is curved.

73. A radiator, comprising:

a fluid inlet;

a fluid outlet;

a fluid passageway through which a cooling medium is adapted to flow from said fluid inlet to said fluid outlet, said radiator including a reserve tank fluidly coupled to said fluid passageway for storing cooling medium outside of said fluid passageway; and a connection port for connecting said reserve tank to said fluid passageway, wherein a first end of said connection port adjacent said fluid passageway is curved with a first radius of curvature and a second end of said connection port adjacent said reserve tank is curved with a second radius of curvature, said first radius of curvature is greater than said second radius of curvature.

74. A radiator, comprising:

a fluid inlet;

a fluid outlet;

a fluid passageway through which a cooling medium is adapted to flow from said fluid inlet to said fluid outlet, said radiator including a reserve tank fluidly coupled to said fluid passageway for storing cooling medium outside of said fluid passageway; and a connection port for connecting said reserve tank to said fluid passageway, wherein a wall portion of said reserve tank extending to said connection port is angled with respect to said connection port such that cooling medium stored in said reserve tank is guided into said connection port.

75. A radiator, comprising:

a fluid inlet;

a fluid outlet;

a fluid passageway through which a cooling medium is adapted to flow from said fluid inlet to said fluid outlet, said radiator including a reserve tank fluidly coupled to said fluid passageway for storing cooling medium outside of said fluid passageway; and a connection port for connecting said reserve tank to said fluid passageway, wherein a portion of said fluid passageway adjacent said connection port forms a winding path.

76. The radiator of claim 75, wherein a part of said portion extending to said connection port includes a concave wall portion facing the fluid passageway.

77. A radiator, comprising:

a fluid inlet;

a fluid outlet; and a fluid passageway through which a cooling medium is adapted to flow from said fluid inlet to said fluid outlet, said radiator including a reserve tank fluidly coupled to said fluid passageway for storing cooling medium outside of said fluid passageway, wherein said reserve tank includes a scalable opening for filling the reserve tank with cooling medium, said radiator further comprising one of a cap and a check valve coupled to said opening for selectively sealing said opening.

78. A radiator, comprising:

a fluid inlet;

a fluid outlet; and a fluid passageway through which a cooling medium is adapted to flow from said fluid inlet to said fluid outlet, said radiator including a reserve tank fluidly coupled to said fluid passageway for storing cooling medium outside of said fluid passageway, wherein said reserve tank includes a plurality of overlapping baffles extending alternately from opposing wall portions of said reserve tank.

79. A radiator, comprising:

a fluid inlet;

a fluid outlet;

a fluid passageway through which a cooling medium is adapted to flow from said fluid inlet to said fluid outlet, said radiator including a reserve tank fluidly coupled to said fluid passageway for storing cooling medium outside of said fluid passageway;

a connection port for connecting said reserve tank to said fluid passageway; and at least one extension reserve tank which is angled relative to said reserve tank, said reserve tank is positioned on a first side of said connection port and said fluid passageway is positioned on a second side of said connection port opposite to said first side, at least a portion of said at least one extension reserve tank extending into said second side.

80. A radiator, comprising:

a fluid inlet;

a fluid outlet;

a fluid passageway through which a cooling medium is adapted to flow from said fluid inlet to said fluid outlet, said radiator including a reserve tank fluidly coupled to said fluid passageway for storing cooling medium outside of said fluid passageway; and two radiator boards having good thermal conductivity coupled together whereby at least one of facing surfaces of the coupled radiator boards are configured so as to form patterned space between said facing surfaces, said patterned space forming at least one of said fluid passageway and said reserve tank.

81. A cooling apparatus, comprising:

a radiator comprising:

a fluid inlet;

a fluid outlet; and a fluid passageway through which a cooling medium is adapted to flow from said fluid inlet to said fluid outlet; said radiator including a reserve tank fluidly coupled to said fluid passageway for storing cooling medium outside of said fluid passageway;

a cooler; and a circulation pump provided in a closed circulation path for circulating the cooling medium, said cooler removing heat from a heating element by using said cooling medium, said radiator radiating the removed heat, wherein said fluid passageway constitutes a part of said closed circulation path, and at least one of said fluid passageway and said reserve tank are formed by abutment by joining a radiation board on which curved surfaces as flow path walls of the internal circulation path and the reserve tank are integrally formed, with another radiation board.

82. The cooling apparatus of claim 81, wherein said fluid passageway and said reserve tank are connected by a bubble outflow limiting path for limiting movement of mingled bubbles in one direction.

83. The cooling apparatus of claim 81, wherein said reserve tank is provided in an upper part of said radiator.

84. The cooling apparatus of claim 81, wherein a first extension reserve tank and a second extension reserve tank which extend downward are provided at both ends of said reserve tank.

85. The cooling apparatus of claim 81, wherein dimples are formed on the radiation board constituting said reserve tank and connect the two radiation boards.

86. The cooling apparatus of claim 81, wherein said reserve tank is arranged in an upward direction and in a lateral direction of said radiator, and baffles inclined obliquely upward are alternately arranged on both lateral sides in said reserve tank.

87. The cooling apparatus of claim 81, wherein said reserve tank has an internal height greater than the internal height of the fluid passageway.

88. The cooling apparatus of claim 81, wherein a joint is provided at least one position on said reserve tank.

89. The cooling apparatus of claim 81, wherein said pump is a volute pump comprising a ring-shaped impeller which has many blades formed on its outer circumference and a rotor magnet provided on its inner circumference, a motor stator provided on the inner circumferential side of said rotor magnet, and a pump casing which has a cylindrical part formed therein to be arranged between said motor stator and said rotor magnet, houses said impeller therein and has an inlet and an outlet, said cylindrical part pivotally supporting said ring-shaped impeller so that said ring-shaped impeller is rotatable.

90. The cooling apparatus of claim 81, further comprising an electronic equipment having a first casing in which an electronic circuit including a central processing unit and a storage unit are housed and which has a keyboard provided on its upper side, and a second casing having a display device capable of displaying the result of processing by said central processing unit, said second casing being rotatably mounted on said first casing.

91. The cooling apparatus of claim 81, wherein said cooling medium is a nonfreezing solution.

92. The cooling apparatus of claim 82, wherein said bubble outflow limiting path is provided at one position.

93. The cooling apparatus of claim 82, wherein the bottom surface of said reserve tank is inclined obliquely downward toward said bubble outflow limiting path.

94. The cooling apparatus of claim 82, wherein the cross-sectional area of the fluid passageway increases near said bubble outflow limiting path.

95. The cooling apparatus of claim 82, wherein the upper surface of the fluid passageway adjacent to the lower part of said reserve tank is inclined obliquely upward toward said bubble outflow limiting path.

96. The cooling apparatus of claim 82, wherein the fluid passageway is winding rear said bubble outflow limiting path.

97. The cooling apparatus of claim 82, wherein the bottom surface of said reserve tank is inclined obliquely upward toward said bubble outflow limiting path.

98. The cooling apparatus of claim 82, wherein said fluid passageway and said reserve tank are connected with each other by the bubble outflow limiting path, and said fluid passageway surrounds said reserve tank.

99. The cooling apparatus of claim 84, wherein each of said first extension reserve tank and said second extension reserve tank has a capacity which is ½ of the capacity of said reserve tank.

100. The cooling apparatus of claim 88, wherein said joint has a check valve.

101. The cooling apparatus of claim 90, wherein the radiator is arranged on the back side of the display device of said second casing.

* * * * *